US007305672B2

(12) United States Patent
Vincent

(10) Patent No.: US 7,305,672 B2
(45) Date of Patent: Dec. 4, 2007

(54) DYNAMIC SOFTWARE UPDATE SYSTEM, METHOD AND PROGRAM PRODUCT

(75) Inventor: Christopher R. Vincent, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 422 days.

(21) Appl. No.: 10/752,473

(22) Filed: Jan. 6, 2004

(65) Prior Publication Data

US 2005/0149922 A1 Jul. 7, 2005

(51) Int. Cl.
*G06F 9/44* (2006.01)
(52) U.S. Cl. .................. 717/172; 717/169; 717/177
(58) Field of Classification Search ......... 717/168–178
See application file for complete search history.

(56) References Cited

U.S. PATENT DOCUMENTS

| 6,185,734 | B1* | 2/2001 | Saboff et al. ............... 717/164 |
| 6,212,557 | B1* | 4/2001 | Oran .......................... 709/221 |
| 2001/0025372 | A1 | 9/2001 | Vermeire et al. | |
| 2002/0078142 | A1 | 6/2002 | Moore et al. | |
| 2002/0083097 | A1 | 6/2002 | Warrington | |
| 2003/0066065 | A1* | 4/2003 | Larkin ........................ 717/177 |

FOREIGN PATENT DOCUMENTS

FR    2 793 910    11/2000

WO    WO 02/01332    1/2002

OTHER PUBLICATIONS

Liebig et al., "A publish/subscribe CORBA persistent state service prototype", ACM, 231-255, 2000.*
"Method for Permitting Several Versions of a Module to Coexist Within a Virtual Machine," IBM Research Disclosure #443177; Mar. 2001 Research Disclosure, pp. 498-501.
"Method to Update Java Class Library in Client Computer at Runtime," IBM Research Disclosure #445141; May 2001 Research Disclosure, p. 847.

* cited by examiner

*Primary Examiner*—Ted T. Vo
(74) *Attorney, Agent, or Firm*—John E. Campbell; Stephen Bongini; Fleit Kain Gibbons Gutman Bongini & Bianco P.L.

(57) ABSTRACT

A system, method and computer program product are disclosed for dynamically updating a computer application. According to the method, a subscription request is sent to a publish/subscribe server so as to receive updates to the computer application. An update notification or an update is received from the publish/subscribe server, and the update is dynamically applied to the computer application during execution without restarting the computer application. In one embodiment, the update notification is received from the publish/subscribe server, a request for the update is sent to a second server, and the update is received from the second server. Also provided are a system, method and computer program product for sending updates to a computer application.

11 Claims, 7 Drawing Sheets

DYNAMIC SOFTWARE UPDATE SYSTEM, METHOD AND PROGRAM PRODUCT

BACKGROUND OF THE INVENTION

1. Field of the Invention

This invention generally relates to the field of computer applications, and more specifically to a dynamic software update system for such applications.

2. Description of Related Art

Computer networks such as the Internet allow users to share resources such as files and hardware. The expansion of the Internet and the adoption of standards for the World Wide Web have made the viewing and downloading of files by a user almost effortless. The user need not know any programming languages. By simply running a Web browser, the user only needs to point and click to view and download desired files. The availability of such programs allows for easy collaboration and file sharing among like-minded individuals separated by great distances over a distributed computer network, which can literally span the entire globe.

In a conventional client/server infrastructure, a distributed computer network is set up to have at least one server node and multiple client nodes. In particular, each user node is a client that can access a server node over the network and, with the proper authorization, publish files to the server node. Once a file is published to the server node, other clients on the network can access the server node to view or download the file. Additionally, the server node can allow a client to automatically send a file to another client that is reachable over the network. The client simply sends the file to the server node along with information identifying the desired recipient, and the server node sends the file on to the corresponding client. The server node can also be used to allow the clients to share hardware resources such as a printer.

It is now common practice for computer applications to include an "update" feature which checks a location on the Internet for updates to its source code. A computer application typically checks for an update whenever it launches, periodically or in response to a user request. The update operation downloads the updated program components, then requires the user to restart the computer application to apply the updates. This type of update operation is disruptive to the user experience, and therefore, many software providers release updates relatively infrequently. Furthermore, it is very difficult for a Web site or critical systems operator to shut down and restart an application. At the same time, it is difficult, if not impossible, to apply updates dynamically (without restarting the computer application) to a computer application implemented in a statically compiled language, such as C or C++.

Therefore a need exists to overcome the problems discussed above, and particularly for a way to more efficiently update computer applications.

SUMMARY OF THE INVENTION

One aspect of the present invention is to provide a system, method and computer program product for dynamically updating a computer application.

Another aspect of the present invention is to provide a system, method and computer program product for sending updates to a computer application.

One embodiment of the present invention provides a method for dynamically updating a computer application. According to the method, a subscription request is sent to a publish/subscribe server so as to receive updates to the computer application. An update notification or an update is received from the publish/subscribe server, and the update is dynamically applied to the computer application during execution without restarting the computer application. In one embodiment, the update notification is received from the publish/subscribe server, a request for the update is sent to a second server, and the update is received from the second server.

Another embodiment of the present invention provides a method for sending updates to a computer application. According to the method, subscription requests for updates to the computer application are received at a publish/subscribe server. An update for the computer application is received at a publish/subscribe server, and an update notification or the update is sent, via publication from the publish/subscribe server, to all subscribers for updates to the computer application.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION OF PREFERRED EMBODIMENTS

1. Introduction

The present invention, according to a preferred embodiment, overcomes problems with the prior art by providing an efficient and easy-to-implement method for dynamically updating a computer application without requiring restart of the computer application.

A computer application written in a dynamic programming language or incrementally compiled language has computer application updates applied at runtime. In other words, the source code of the computer application is changed at runtime. The disclosed system provides a realtime computer application update system that results in minimal disruption to the user experience. Examples of dynamic programming languages include JavaScript, Dynamic Hypertext Markup Language (DHTML), Extensible Hypertext Markup Language (XHTML), Jscript, Visual Basic Script (VBScript), Perl Script, LISP, PHP and Cold Fusion. Examples of incrementally-compiled languages include interpreted Python and interpreted BASIC.

In a preferred embodiment of the present invention, in addition to traditional update triggers (such as computer application launch, periodic, and user-driven), a computer application connects to a publish/subscribe server (such as the IBM Gryphon system) and listens for applicable computer application updates. The update is applied to the computer application at runtime (i.e., during execution), which is transparent to the computer application's users. Using a publish/subscribe server ensures that running computer applications are updated as soon as possible after an improvement is released, and this addresses a common security issue. Digital signatures ensure that computer application updates are authored by the original software provider or an authorized third party.

Such computer application updates can fix security problems, correct programmer errors, or modify the appearance of a running computer application. Examples of functions performed by software updates include redefining an erroneous function with an improved implementation, modifying the appearance of a user interface, changing the background color of an interface or adding a button to an interface.

2. Overview of the System

Figure 1:
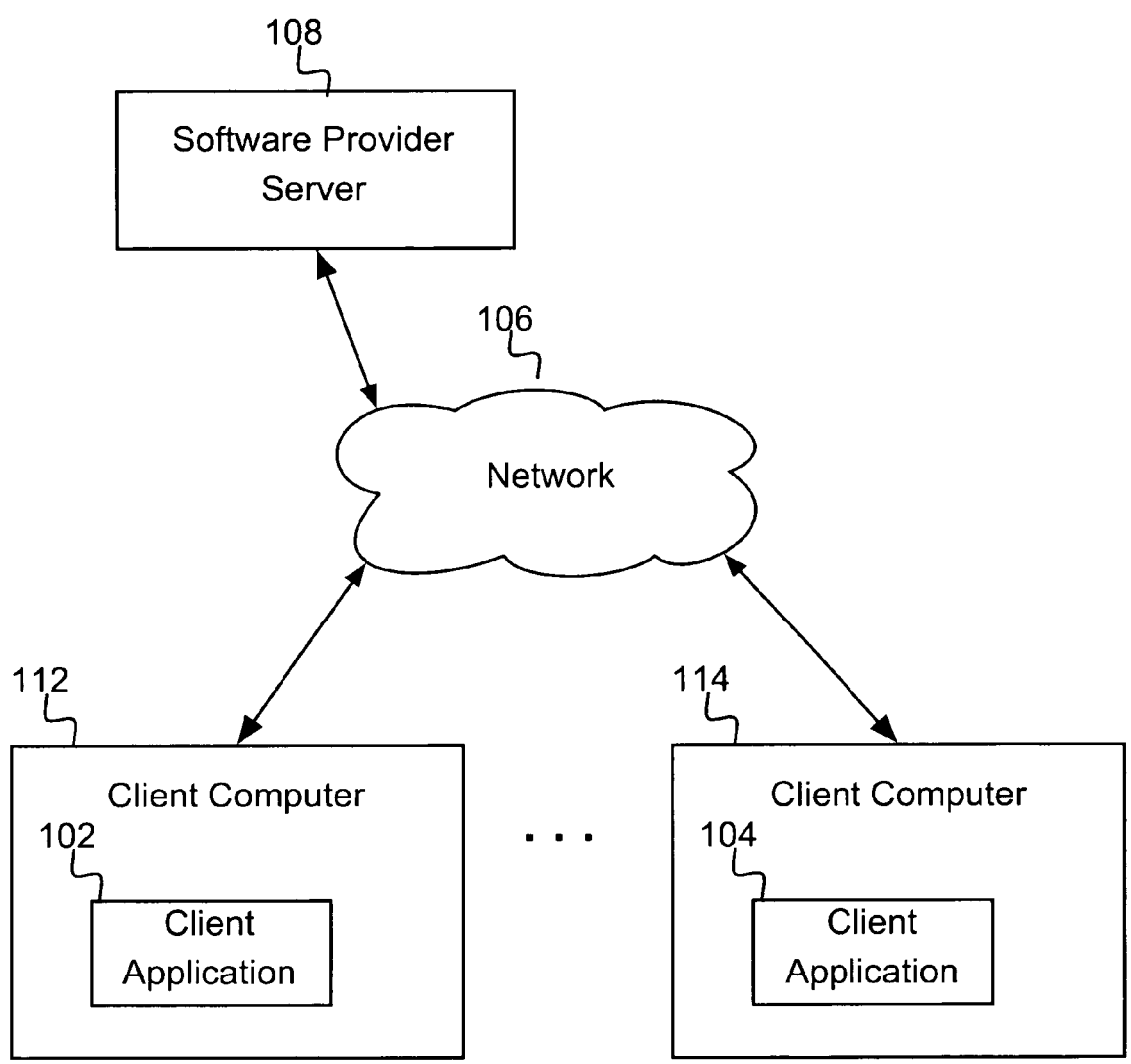
FIG. 1 is a block diagram illustrating the overall system architecture of a conventional computer network.

FIG. 1 is a block diagram illustrating the system architecture of a conventional computer network. FIG. 1 shows client computers 112 and 114, on which client applications 102 and 104, respectively, are located. FIG. 1 also shows a software provider server 108, which provides software and/or updates to the client computers 112 and 114. The software provider server 108 comprises any commercially available server system that allows client computers 112 and 114 to exist in a client/server relationship with the software provider server 108. For example, the computer systems of client computers 112 and 114 and server 108 can be one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. The computer systems of any of the client computers 112 and 114 and server 108 are also able to be a server system (e.g., SUN Ultra workstations running the SunOS operating system or IBM RS/6000 workstations and servers running the AIX operating system). An exemplary computer system for client computers 112 and 114 and server 108 is described in greater detail below with reference to FIG. 6.

The network 106 is a circuit switched network, such as the Public Service Telephone Network (PSTN). Alternatively, the network is a packet switched network. The packet switched network is a wide area network (WAN), such as the global Internet, a private WAN, a local area network (LAN), a telecommunications network or any combination of the above-mentioned networks. In yet another alternative, the network is a wired network, a wireless network, a broadcast network or a point-to-point network.

The software provider server 108 is an entity that provides the software constituting the computer applications 102 and 104. The software provider server 108 can be operated by the actual developer of the computer applications 102 and 104, or a third party. The software provider server 108 also provides updates for client applications 102 and 104 to the computers 112 and 114. In this sense, the software provider server 108 acts as a repository for storing a multitude of updates for client applications 102 and 104.

Figure 2:
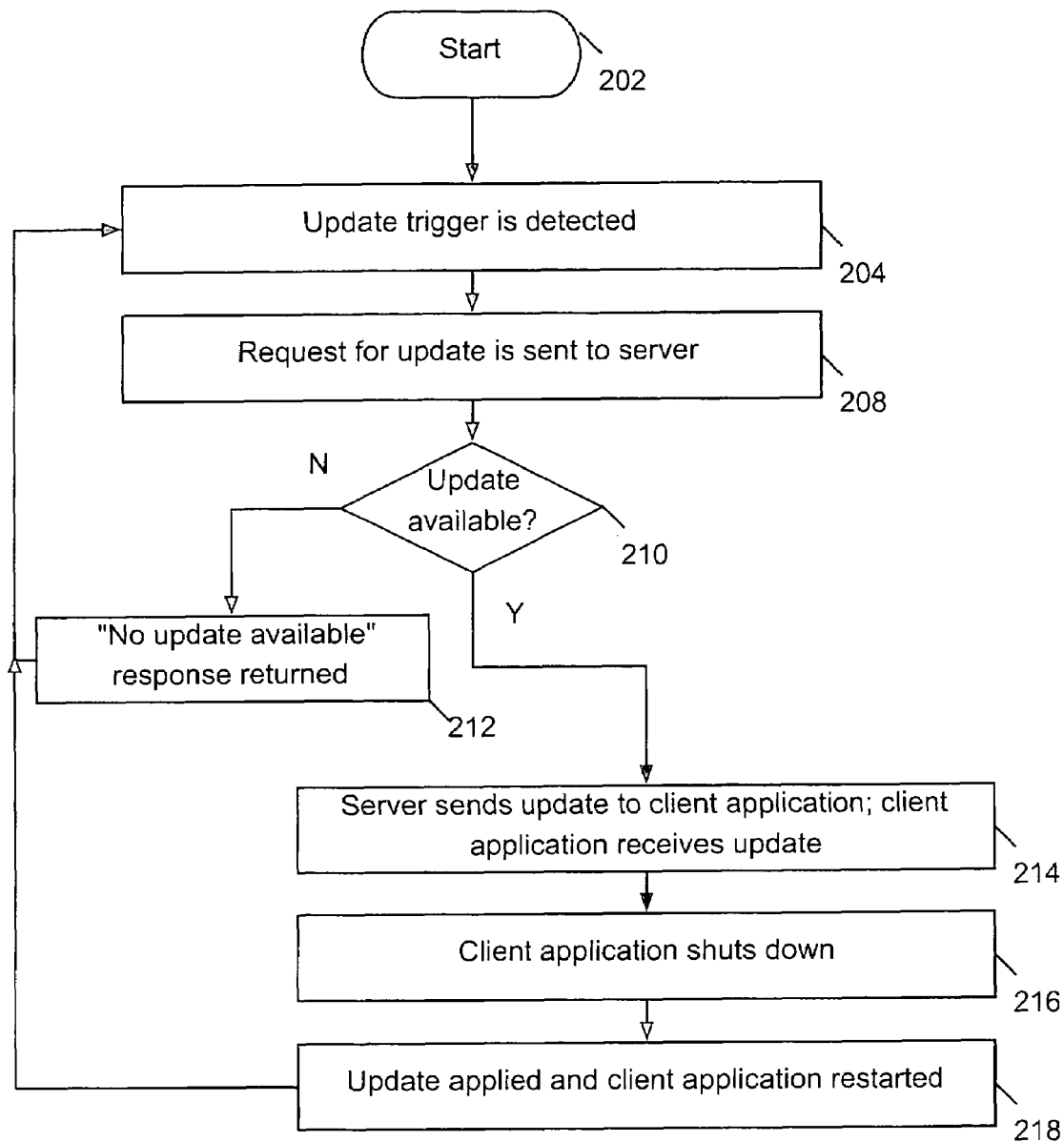
FIG. 2 is a flowchart depicting the overall operation and control flow of a conventional computer application update system.

FIG. 2 is a flowchart depicting the overall operation and control flow of a conventional computer application update system. The operation and control flow of FIG. 2 begins with step 202 and proceeds directly to step 204.

In step 204, an update trigger is detected by the client application 102. An update trigger is an event that prompts the update process to start. For example, the update process may be started by the start of execution of the client application 102. Thus, upon start-up of the client application 102, the update process begins. Alternatively, or additionally, the update process may be started periodically at predefined times or after predefined periods of time, or upon a user command. More generally, the update process may be started by any event that is detectable by the client application 102.

In step 208, the client application 102 sends a request for an update to the software provider server 108. In step 210, the software provider server 108 determines whether an update is available for client application 102. If the result of this determination is affirmative, then control flows to step 214. If the result of this determination is negative, then control flows to step 212. In step 212, a "no update available" response is returned and the client application 102 continues to execute normally.

In step 214, the software provider server 108 sends an update to the client application 102. The client application 102 receives the update and prepares to apply the update. In step 216, the client application 102 shuts down in order to apply the received update. In step 218, the update is applied to the client application 102 and optionally the client application 102 is restarted.

Figure 3A:
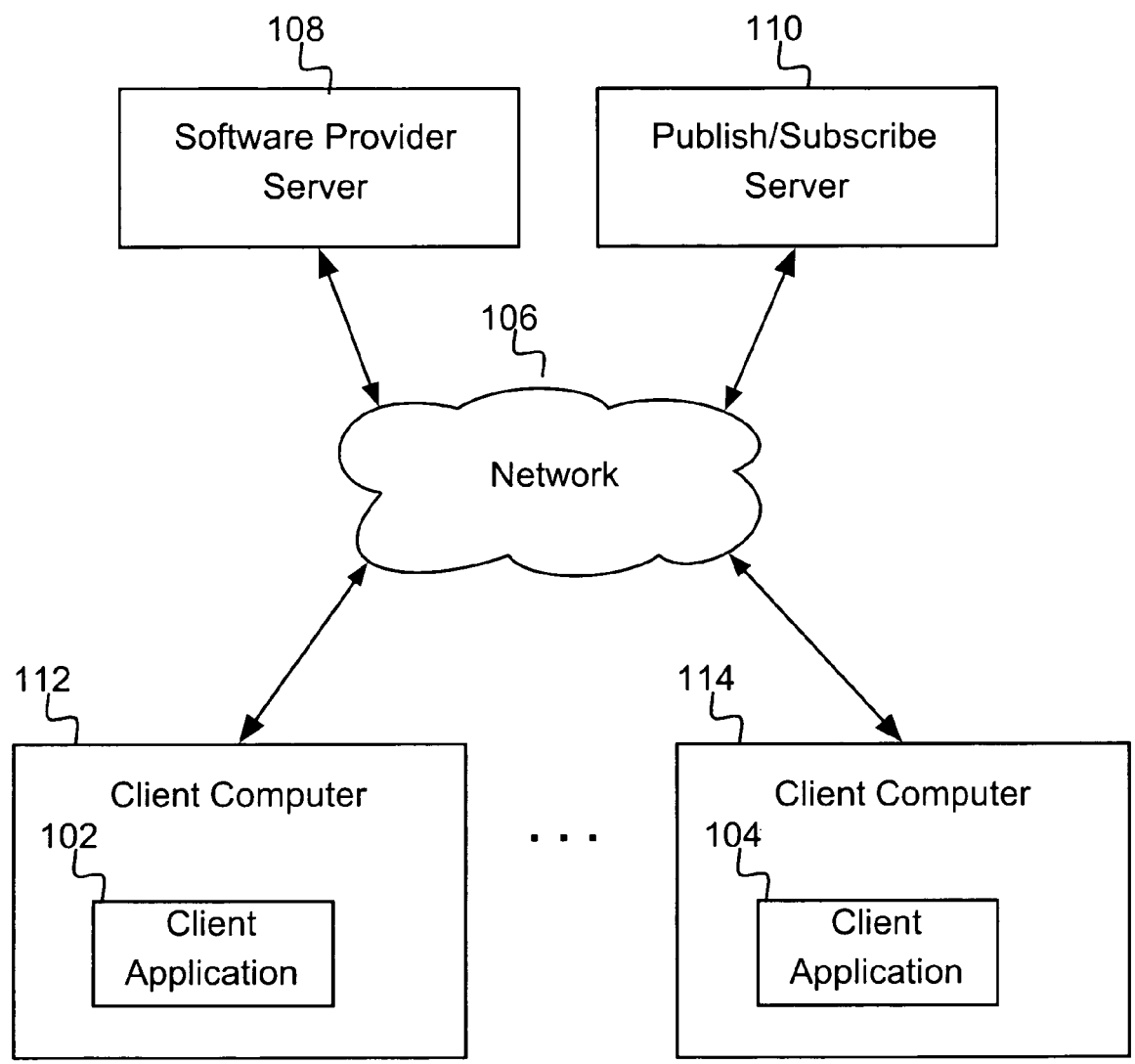
FIG. 3A is a block diagram illustrating the overall system architecture of a preferred embodiment of the present invention.

FIG. 3A is a block diagram illustrating the overall system architecture of a preferred embodiment of the present invention. The software provider server 108, client computer 112, client application 102, client computer 114, client application 104, and network 106 are the same as the corresponding elements of FIG. 1. The publish/subscribe server 110 is a publish/subscribe messaging system that utilizes an information flow graph, such as the Gryphon system (described at http://www.research.ibm.com/gryphon) that has been developed by the assignee of the present invention. The Gryphon system provides a content-based subscription service and performs message brokering by merging the features of distributed publish/subscribe communications and database technology. At the core of the Gryphon system is an information flow graph that specifies the selective delivery of events, the transformation of events, and the generation of new events.

An exemplary implementation of a publish/subscribe messaging system is a system for delivering information on stock trades. In this system, stock trades derived from two information sources (NYSE and NASDAQ) are combined, transformed, filtered and delivered to subscribing clients. For example, one user may subscribe and request to receive all stock trades on both the NYSE and NASDAQ that have a value of over one million dollars. The publish/subscribe messaging system receives raw stock trade information such as price and volume from both the NYSE and NASDAQ. Based on the subscription of the user, the server merges the stock trade information from the two sources, transforms the raw price and volume information into value information for each trade, and then filters the derived values to produce the subset of trades that are valued at over one million dollars. In a similar manner, each subscribing user specifies its own criteria, and the publish/subscribe messaging system performs information selection, transformation, filtering, and delivery in order to provide each user with the requested information. Further information about publish/subscribe messaging systems is available in U.S. patent application Ser. No. 10/207,685, filed Jul. 26, 2002 (entitled "INTERACTIVE ONE TO MANY COMMUNICATION IN A COOPERATING COMMUNITY OF USERS"), which is assigned to International Business Machines Corporation and is incorporated herein by reference.

In embodiments of the present invention, each "server" (such as the software provider server 108 and the publish/subscribe server 110) can each be implemented by a single server or by a server cloud that is made up of any number of servers. The individual servers of such a server cloud can be connected to one another and to the Internet in various ways and can even be separated by great distances so as to provide an appropriate level of service and advantageous features such as data and path redundancy.

In the embodiment of FIG. 3A, a client application, such as client application 102, registers with the publish/subscribe server 110 and subscribes in order to receive update notifications and/or updates for the client application. Update notifications and updates can be sent in a variety of ways, as is described in greater detail below. Although software provider server 108 and publish/subscribe server 110 are shown as separate entities in FIG. 3A, the functions of both entities can be integrated into one entity. Further, although FIG. 3A shows two client computers 112 and 114 and two computer applications 102 and 104, the present invention can support any number of client computers and computer applications.

Figure 3B:
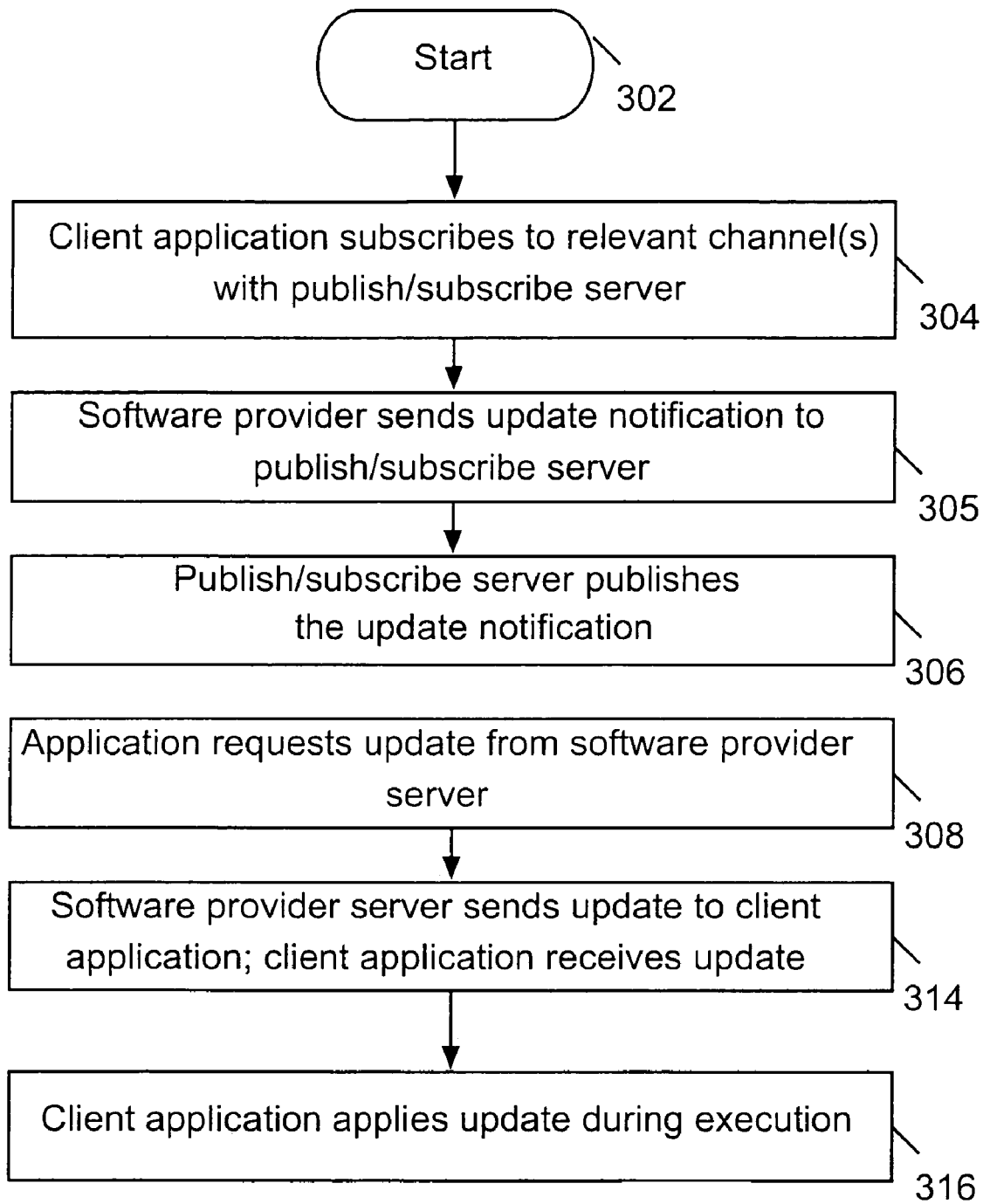
FIG. 3B is a flowchart depicting the overall operation and control flow of an update system according to a preferred embodiment of the present invention.

FIG. 3B is a flowchart depicting the overall operation and control flow of an update system according to a preferred embodiment of the present invention. The operation and control flow of FIG. 3B begins with step 302 and proceeds directly to step 304.

In step 304, a client application written in a dynamic programming language or incrementally compiled language, such as client application 102, subscribes to one or more channels with the publish/subscribe server 110 in order to receive update notifications for the client application 102. During subscription, the client application 102 identifies itself to the publish/subscribe server 110 and specifies and specifies the address for sending update notifications to the client application 102.

In step 305, the software provider server 108 sends an update notification to the publish/subscribe server 110 to announce the availability of a new update. In step 306, the publish/subscribe server 110 publishes the update notification by sending it to all subscribers to the relevant channel, including client application 102.

In step 308, in response to the update notification, the client application 102 sends a request for the update to the software provider server 108. In step 314, the software provider server 108 sends the update to the client application 102. The client application 102 receives the update and prepares to apply the update. In step 316, the update is dynamically applied to the client application 102 (i.e., during execution without requiring restart or other disruption of the client application 102). In an alternative embodiment, the publish/subscribe server 110 publishes the update itself, as opposed to an update notification, in step 306. This eliminates the need for the client application to request and receive the update from the software provider server 108, but greatly increases the load on the publish/subscribe server 110.

In embodiments of the present invention, the sending of the request for the update and the transmission of the update can be performed in a variety of ways including through one or more of email, instant messaging, File Transfer Protocol (FTP), Hypertext Transfer Protocol (HTTP) or any other manner of transmitting information over a network. In preferred embodiments of the present invention, the transmission of the update is performed over a connection between the client application 102 and the software provider server 108, such as a Virtual Private Network (VPN) connection, a Transfer Control Protocol/Internet Protocol (TCP/IP) connection, or any other network connection.

In some embodiments of the present invention, when the client application 102 is first launched, it contacts the software provider server 108 and requests the cumulative changes since its last update (e.g., based on version numbers). Any such updates are sent to the client application 102 by the software provider server 108 to bring the application up-to-date at startup. After this initial update synchronization, any new updates that are released are announced or sent to the client application 102 via the publish/subscribe server 110.

Preferably, all updates are provided to the client application 102 in a secure fashion. For example, in one embodiment, the connection for sending an update to the client application 102 is encrypted, such as through a VPN or HTTPS connection. Additionally, or alternatively, the update can be cryptographically protected (e.g., encrypted or digitally signed) to ensure that the update received by the client application is genuine.

Accordingly, the present invention allows for a publish/subscribe system to be used to announce or send updates and for updates to be applied dynamically to a client application without the disruption of restarting the client application or otherwise necessitating other user input. This makes the update process transparent to the user and user friendly. This also allows for the maintenance and upgrading of fielded software components without imposing or otherwise burdening users of the client application.

3. Web Page Implementation

Figure 4:
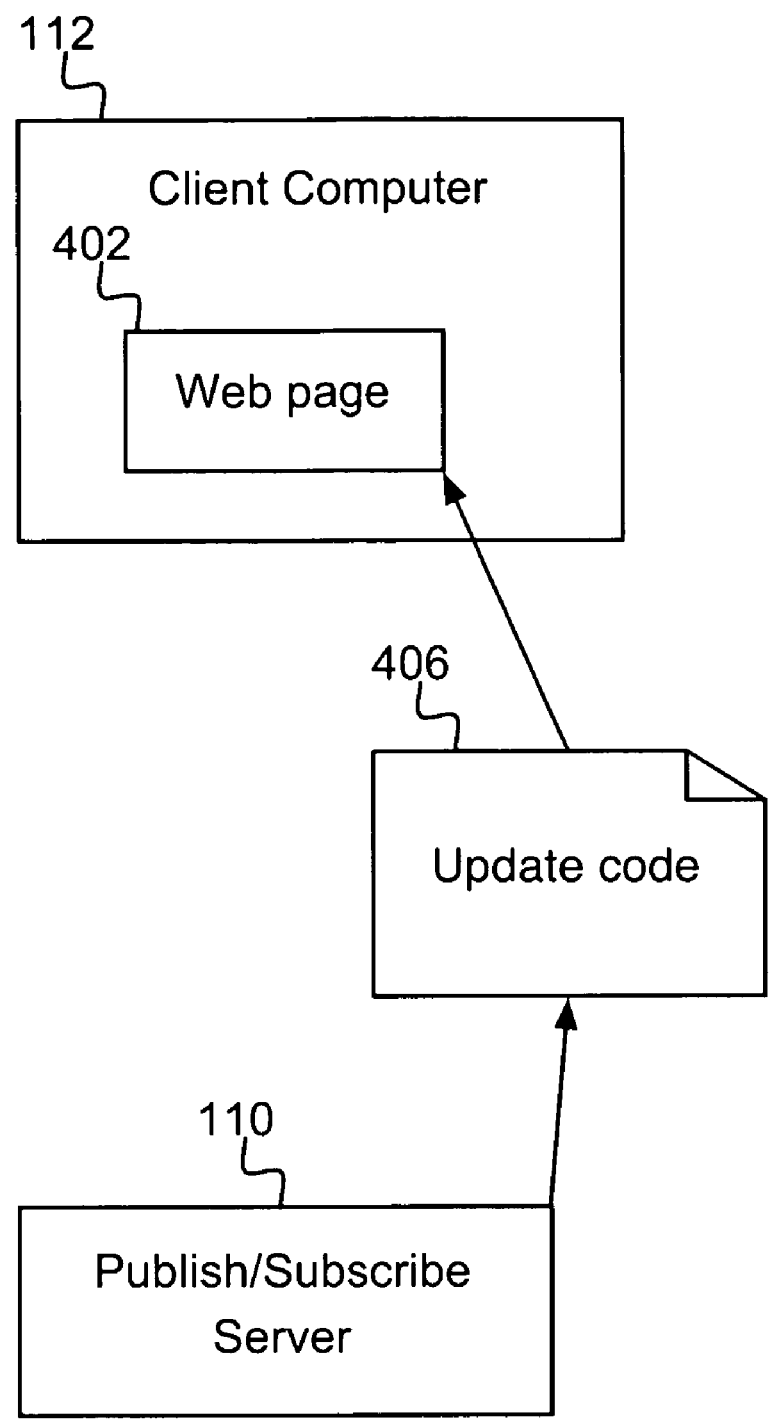
FIG. 4 is a block diagram depicting one exemplary implementation of the present invention.

FIG. 4 is a block diagram depicting one exemplary implementation of the present invention. Specifically, the block diagram of FIG. 4 portrays an exemplary Web page implementation of the present invention. As shown, a client computer 112 is executing a resident client application—a Web page 402 that has been loaded using, for example, a Web browser. FIG. 4 also shows a publish/subscribe server 110.

Figure 5:
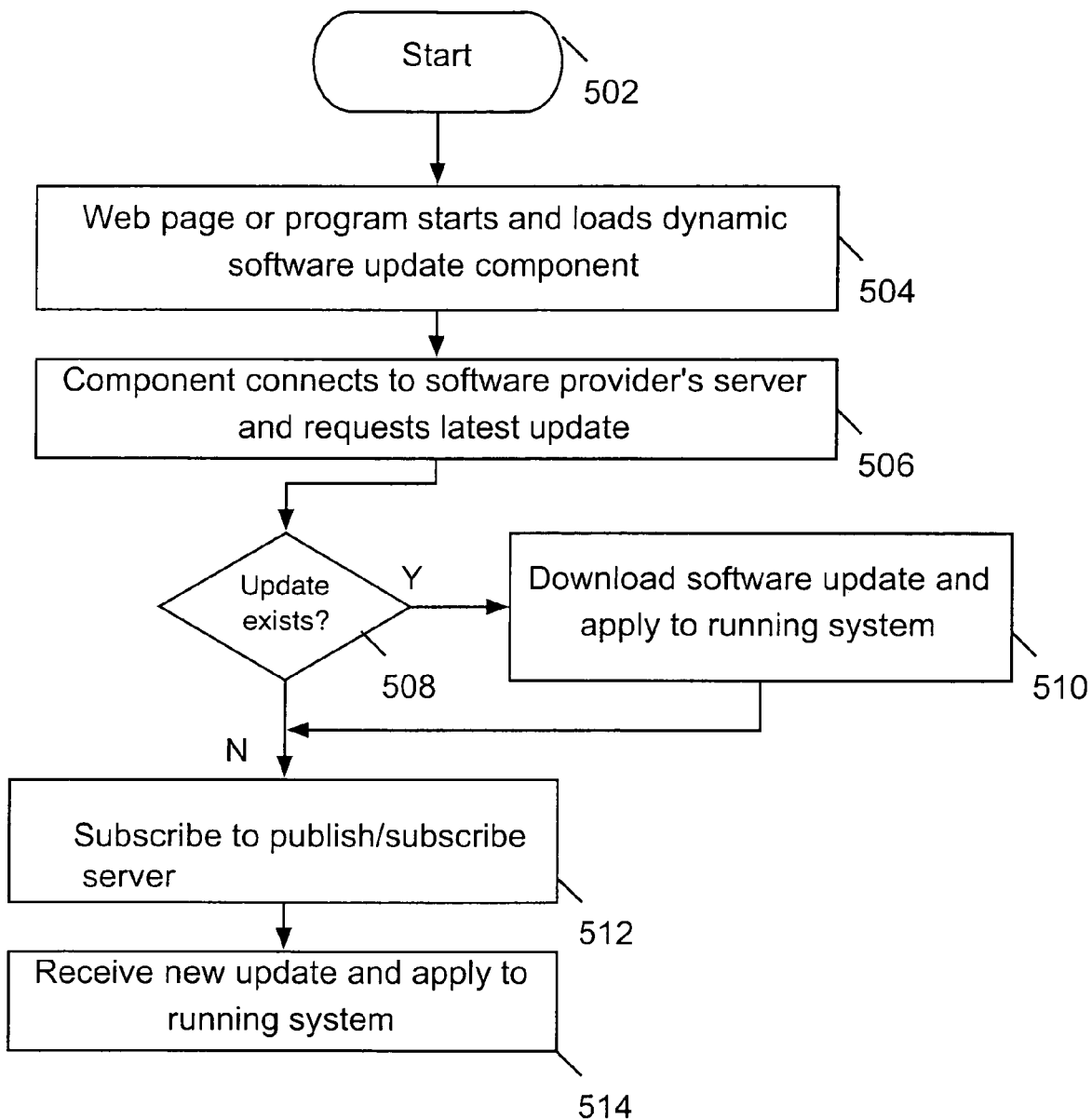
FIG. 5 is a flowchart depicting the operation and control flow of the computer application update process of the exemplary implementation of FIG. 4.

FIG. 5 is a flowchart depicting the operation and control flow of the computer application update process of the exemplary implementation of FIG. 4. In step 504, a user loads the Web page 402 that comprises the client application. The client application includes a dynamic software update component. In this exemplary embodiment, the Web page 402 is written in JavaScript, which is a dynamic programming language. In step 506, the dynamic software update component of the Web page 402 connects to the software provider server and requests the latest update. If an update exists, then control flows to step 510. Otherwise, control flows to step 512.

In step 510, the software provider server sends the update to the client computer 112 and the update is dynamically applied to the Web page 402. In step 512, the Web page 402 subscribes to the appropriate channel with the publish/subscribe server 110 in order to receive any future updates.

In step 514, a new update is produced, so the publish/subscribe server 110 publishes the new update 406 by sending it to all subscribers to the relevant channel, including the Web page 402. Upon receiving the new update 406, the Web page 402 applies the new update 406 dynamically. Thus, the updated Web page is presented to the user without requiring restart, reload or other disruption of the Web page. For example, if the update comprises an update to the JavaScript code of the Web page to change the code that executes when the user clicks a button on the Web page 402, the updated code is executed the next time the user clicks the button. Alternatively, the publish/subscribe server 110 can publish an update notification, as opposed to the update itself, as in the embodiment described above with reference to FIG. 3B.

Another example of a dynamic update is an update that changes an HTML attribute of the Web Page, such as a change in the background color. In such a case, the HTML file for the Web page on the Web server is changed so that the updated Web page will be provided whenever the Web page is loaded or reloaded. Additionally, a JavaScript code update is sent out via the publish/subscribe server. Thus, if the Web page is already open, the update component evaluates the new code and immediately changes the background color of the Web page. Preferably, the client is instructed to always check the Web server for a newer version when loading the Web page (e.g., in HTTP headers), so that the updated version of the Web page is received whenever the page is reloaded.

For the purpose of illustration, one specific example of a dynamic update and the process by which it is dynamically applied without restart or reloading will now be explained in more detail.

Consider a Web interface that is a complicated form and/or a Web page that a user keeps open for long periods (e.g., all day). Conventionally, the user would not receive updates or bug fixes for this Web interface until the Web page is reloaded in the user's Web browser. Similarly, some desktop applications actually use a Web browser control to implement user interface logic and rendering. Such an application typically reloads the DHTML content only when the application starts, or even as infrequently as when a manual update is performed.

The DHTML source code below is for an exemplary Web interface for inputting a "claim Form". The claim form includes text fields for entering a name, phone number and zip code, and a "process form" button. Note that the "updater" object is embedded in the Web page, and a helper function, "on Eval", allows the control to conveniently evaluate code in the context of the current page.

```
<html>
<head>
<title>Claim Form</title>
<style>
    body, input, table {
        font: 10pt verdana;
    }
</style>
<script language="JavaScript">
function validateForm(form) {
    if (form.phoneNumber.value.length == 12) {
        return true;
```

-continued

```
    } else {
        alert("Phone number invalid.");
        form.phoneNumber.focus( );
        form.phoneNumber.select( );
        return false;
    }
}
function onLoad( ) {
    scriptUpdater.onEval = onEval;
}
function onEval(text) {
    eval(text);
}
</script>
</head>
<body>
<p>
    <b>Claim Form</b>
</p>
<form name="claimForm" action="http://ibm.com/claims/processClaim.jsp" method="POST" onsubmit="return validateForm(this)">
    <table>
        <tr>
            <td>
                Name:
            </td>
            <td>
                <input name="name" type="text">
            </td>
        </tr>
        <tr>
            <td>
                Phone Number:
            </td>
            <td>
                <input name="phoneNumber" type="text">
            </td>
        </tr>
        <tr>
            <td>
                ZIP Code:
            </td>
            <td>
                <input name="zipCode" type="text">
            </td>
        </tr>
        <tr>
            <td colspan="2" align="right">
                <input type="submit" value="Process Form">
            </td>
        </tr>
    </table>
</form>
<object id="scriptUpdater"
    classid="clsid:B63B82EE-4AC1-4770-859B-56793D3F5861"
    codebase="updater.cab"
    onreadystatechange="onLoad( );"
    style="display: none;">
    <param name="server" value="updates.ibm.com:1500">
    <param name="user" value="anonymous">
    <param name="password" value="none">
</object>
</body>
</html>
```

The developer later realizes this source code validates the phone number by merely testing the overall length of the phone number string that is entered, and desires to update the source code so that a regular expression is used to verify that a 10-digit numeric phone number is entered with or without dashes. For this purpose, the developer uses an integrated development environment (IDE) to edit the DHTML source code in the original HTML file to remove:

if (form.phoneNumber.value.length==12)

and replace it with the following.

```
if (form.phoneNumber.value.match(/^\s*\d\d[-]
    *\d\d[-]*\d\d\d\s*$/))
```

The developer then copies the modified HTML file to the Web server, which updates the Web page for any user who subsequently loads or reloads the page.

The developer also takes additional action so as to update users that already have the Web page open in a browser or application. In particular, the IDE recommends updating the function definition for "validateForm" because some of its code has been modified, and suggests sending out the following update, to be evaluated in the context of Web pages that are already open.

```
validateForm = \
function (form) { \
    if (form.phoneNumber.value.match(/^\\s*\\d\\d[-]*\\d\\d
            [-]*\\d\\d\\d\\s*$/)) { \
        return true; \
    } else { \
        alert(\"Phone number invalid.\"); \
        form.phoneNumber.focus( ); \
        form.phoneNumber.select( ); \
        return false; \
    } \
}
```

As shown, the development environment converted the function definition into an equivalent JavaScript statement, appropriate for redefining a function on-the-fly. The update system must now arrange for JavaScript within each open Web page to call the built-in "eval" function, passing the above statement as the single argument. In this example, the developer accepts the auto-generated update (or patch), and publishes it to users via the publish/subscribe server, as described above. The update is received by any currently connected update controls, and is then applied to those open Web pages.

Such a dynamic update process can also be applied to dynamically generated Web pages in which the developer edits a JSP (Java ServerPages) file instead of an HTML file. Further, the system may utilize version numbers (e.g., on the HTML resources), so as to prevent any redundant updates if the Web page in question has already been reloaded.

While the update in the example above is quite simple and occurs automatically, in more complicated scenarios the developer may need to hand-craft such a patch, adding code to update data structures, supply the JavaScript equivalent of changes to HTML elements, and/or alert the user of changes.

4. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

An embodiment of the present invention can also be embedded in a computer program product that comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 6:
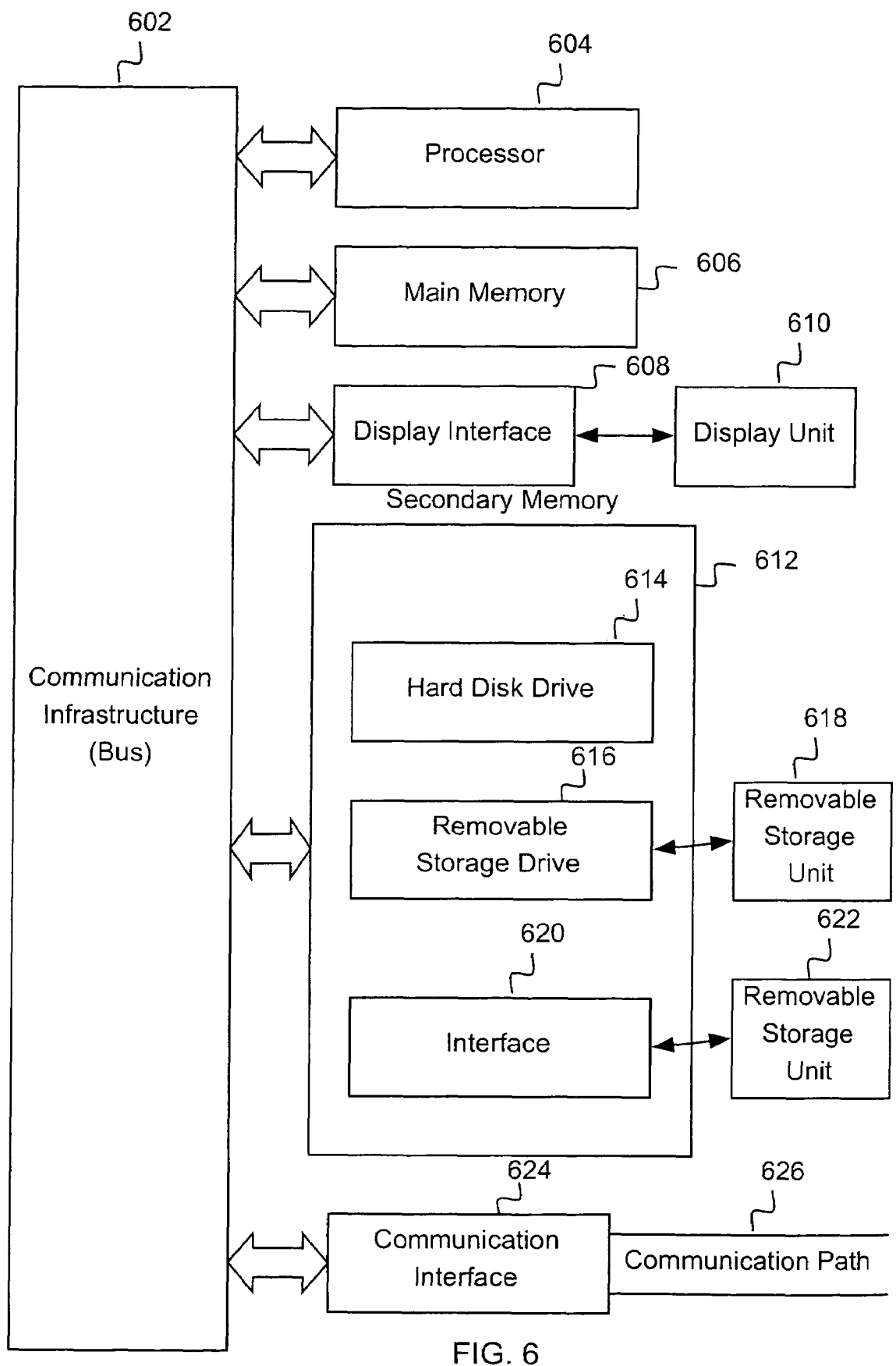
FIG. 6 is a block diagram of a computer system useful for implementing the present invention.

FIG. 6 is a block diagram of a computer system useful for implementing an embodiment of the present invention. The computer system of FIG. 6 includes one or more processors, such as processor 604. The processor 604 is connected to a communication infrastructure 602 (e.g., a communications bus, cross-over bar, or network).

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, the removable storage unit 618 includes a computer usable storage medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCM- CIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for dynamically updating a computer application on a client computer, the method comprising the steps of:

subscribing, by the client computer, with a publish/subscribe server to receive updates to the computer application;

receiving, by the client computer, an update notification via publication from the publish/subscribe server;

automatically sending, by the client computer, a request for an update directly to a second server, in response to receiving the update notification via publication from the publish/subscribe server;

receiving, by the client computer, the update directly from the second server; and in response to receiving the update from the second server, dynamically applying, by the client computer, the update to the computer application during execution of the computer application on the client computer such that the execution of the computer application is continuous and uninterrupted during a time in which the update is dynamically applied, the dynamic application of the update updating source code of the computer application during the execution of the computer application, and the dynamic application of the update being transparent to a user of the computer application.

2. The method of claim 1, wherein the update includes updated source code for the computer application.

3. A method for sending updates to a computer application on a client computer, the method comprising the steps of:

receiving, at a publish/subscribe server, a subscription request from the client computer for updates to the computer application;

receiving, at the publish/subscribe server, an update notification from a second server;

sending, via publication from the publish/subscribe server, the update notification to the client computer;

receiving, at the second server, a request sent directly and automatically from the client computer for an update for the computer application, in response to the update notification; and sending the update for the computer application directly from the second sever to the client computer.

4. The method of claim 3, wherein the update includes updated source code for the computer application.

5. A computer program product for dynamically updating a computer application on a client computer, the computer program product comprising a tangible storage medium readable by a processing circuit and storing computer instructions for performing the steps of:

subscribing, by the client computer, with a publish/subscribe server to receive updates to the computer application;

receiving, by the client computer, an update notification via publication from the publish/subscribe server;

automatically sending, by the client computer, a request for an update directly to a second server, in response to receiving the update notification via publication from the publish/subscribe server;

receiving, by the client computer, the update directly from the second server; and in response to receiving the update from the second server, dynamically applying, by the client computer, the update to the computer application during execution of the computer application on the client computer such that the execution of the computer application is continuous and uninterrupted during a time in which the update is dynamically applied, the dynamic application of the update updating source code of the computer application during the execution of the computer application, and the dynamic application of the update being transparent to a user of the computer application.

6. The computer program product of claim 5, wherein the update includes updated source code for the computer application.

7. A computer program product for sending updates to a computer application on a client computer, the computer program product comprising a tangible storage medium readable by a processing circuit and storing computer instructions for performing the steps of:

receiving, at a publish/subscribe server, a subscription request from the client computer for updates to the computer application;

receiving, at the publish/subscribe server, an update notification from a second server;

sending, via publication from the publish/subscribe server, the update notification to the client computer;

receiving, at the second server, a request sent directly and automatically from the client computer for an update for the computer application, in response to the update notification; and sending the update for the computer application directly from the second sever to the client computer.

8. The computer program product of claim 7, wherein the update includes updated source code for the computer application.

9. A system for dynamically updating a computer application on a client computer, the system including:

a transmitter for transmitting a subscription request to a publish/subscribe server to receive updates to the computer application;

a receiver for receiving an update notification via publication from the publish/subscribe server; and a dynamic update module for, in response to receiving the update, dynamically applying an update to the computer application during execution of the computer application on the client computer such that the execution of the computer application is continuous and uninterrupted during a time in which the update is dynamically applied, the dynamic application of the update updating source code of the computer application during the execution of the computer application, and the dynamic application of the update being transparent to a user of the computer application, wherein the transmitter automatically sends a request for, the update directly to a second server, in response to receiving the update notification via publication from the publish/subscribe server, and the receiver receives the update directly from the second server.

10. A system for sending updates to a computer application on a client computer, the system comprising a publish/subscribe server and a second server, wherein the publish/subscribe server comprises:

a receiver receiving a subscription request from the client computer for updates to the computer application, and receiving an update notification from a second server; and a transmitter sending, via publication, the update notification to the computer client, and the second server comprises:

a receiver receiving a request sent directly and automatically from the client computer for an update for the computer application; and a transmitter directly sending the update for the computer application to the client computer.

11. The system of claim 10, wherein the transmitter of the publish/subscribe server sends, via publication, the update notification to all client computers that are subscribed for updates to the computer application.

* * * * *